United States Patent Office 3,423,418
Patented Jan. 21, 1969

3,423,418
3-SUBSTITUTED-5-(2-HALOETHYL)-2-OXAZOLI-
DINONES AND PRODUCTION OF SAME
Carl D. Lunsford and Marvel L. Fielden, Richmond, Va.,
assignors to A. H. Robins Company, Incorporated,
Richmond, Va., a corporation of Virginia
No Drawing. Continuation-in-part of application Ser. No.
451,970, Apr. 29, 1965. This application Apr. 11, 1966,
Ser. No. 541,483
U.S. Cl. 260—307          27 Claims
Int. Cl. A61k 27/00; C07d 85/28

ABSTRACT OF THE DISCLOSURE

3 - substituted-5-(2-haloethyl)-2-oxazolidinones of the formula:

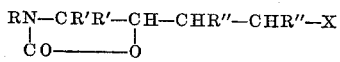

wherein X is halo selected from the group consisting of bromo and chloro,
wherein R is selected from the group consisting of lower-alkyl, lower-cycloalkyl, and phenyllower-alkyl,
wherein R' is selected from the group consisting of hydrogen and methyl, and
wherein R'' is selected from the group consisting of hydrogen and methyl,
and process for making same, which comprises reacting a 1-substituted-3-pyrrolidinol with a carbonyl dihalide, and further reacting the product with a tertiary amine, the products of the invention being useful intermediates for the preparation of tranquilizers and analgesics.

---

This application is a continuation-in-part of Ser. No. 451,970 filed Apr. 29, 1965.

The present invention relates to 3-substituted-5-(2-haloethyl)-2-oxazolidinones and production and use of the same. It is especially concerned with such compounds having the formula:

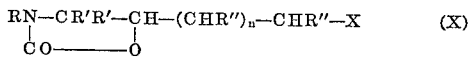   (X)

wherein n is 1 or 2,
wherein R is a substituent, preferably lower-alkyl, cycloalkyl, phenylalkyl, or substituted phenylalkyl,
wherein R' is hydrogen or methyl, preferably hydrogen,
wherein R'' is hydrogen or methyl, preferably hydrogen,
and wherein X is a halogen atom.

It is accordingly an object of the present invention to provide novel and useful compounds and a method of producing the same. Additional objects will become apparent hereinafter and still others will be apparent to one skilled in the art.

In the definition of symbols in the formulas hereof and wherein they appear elsewhere throughout this specification, the terms have the following significance.

A "substituted phenyl" radical is a phenyl radical substituted by any radical or radicals which are not reactive or otherwise interfering under the conditions of reaction, such as nitro, lower-alkoxy, lower-alkylmercapto, lower-alkyl, di-lower-alkylamino, trifluoromethyl, halo, and the like. The substituted phenyl radicals have preferably no more than one to three substituents such as those given above and, furthermore, these substituents can be in various available positions of the phenyl nucleus and, when more than one substituent is present, can be the same or different and can be in various position combinations relative to each other. The lower-alkyl, lower-alkoxy, lower-alkylmercapto, and di-lower-alkylamino substituents each have preferably from one to four carbon atoms which can be arranged as straight or branched chains. A total of nine carbon atoms in all ring substituents, making a total of fifteen carbon atoms in the radical, is the preferred maximum. The term "lower-alkyl" as used herein includes straight and branched chain radicals of up to eight carbon atoms inclusive, preferably no more than six carbon atoms, and is exemplified by such groups as methyl, ethyl, propyl, isopropyl, butyl, sec. butyl, tertiary butyl, amyl, isoamyl, hexyl, heptyl, octyl, and the like. A "lower-alkoxy" group has the formula lower-alkyl-0-.

The symbol

includes such radicals as piperazino, 2,3,5,6-tetramethyl-piperazino, 2- or 5-methylpiperazino, 2- or 5-ethylpiperazino, 2,5-dimethylpiperazino, 2,5-diethylpiperazino, 2-propylpiperazino, 2-butylpiperazino, 3-methylpiperazino, homopiperazino, and the like. The term "cycloalkyl" as used herein includes primary cyclic alkyl radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl. Included in the term "phenylalkyl" are lower-alkyl substituted monocarbocyclic aryl groups such as benzyl, phenethyl, methylbenzyl phenpropyl, and the like. "Substituted phenylalkyl" groups may contain all of the substituents and variations thereof already disclosed for a "substituted phenyl" radical. When halogen is referred to herein, preferably but not necessarily a halogen of atomic weight in excess of nineteen but not greater than eighty is employed. Of the halogens, chlorine is preferred.

The 5-(2-haloethyl)-2-oxazolidinones (X) are especially useful for reaction in a conventional halogen displacement reaction with a compound of the formula:

Z—Y          (XI)

wherein Z is an atom such as Na or H, to split out a halide (Z+X—), and Y is the remainder of the molecule which is desired to be introduced into the alkyl chain at the 5 position of the oxazolidinone ring. This remainder Y of the molecule may be, for example,

phenyl, certain other tertiary amine radicals, or cyano. The resulting amine compounds are useful tranquilizers and analgesics. The resulting cyano compounds are valuable intermediates.

The process of the invention is a process for the production of a 3-substituted-5-(2-haloethyl)-2-oxazolidinone (X) which comprises the steps of (1) reacting (a) a 1-subsituted-3-pyrrolidinol with (b) a carbonyl dihalide and (2) subjecting the product of the reaction to (c) a tertiary amine.

Compound X is provided by reacting a 1-substituted-3-pyrrolidinol with phosgene and then subjecting the intermediate reaction product to a tertiary amine, e.g., pyridine or other tertiary heterocyclic amine, dimethylaniline or other dialkylarylamine, or triethylamine or other trialkylamine, to produce the desired 3-substituted-5-(haloalkyl)-oxazolidinone X. The reaction is as follows:

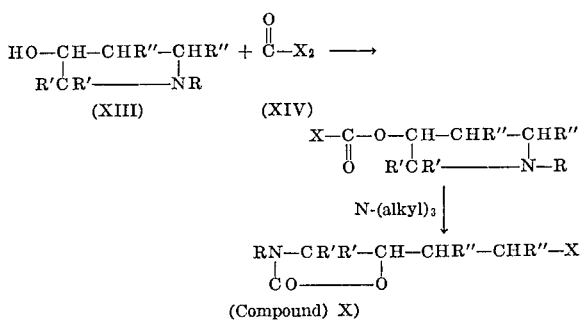

(Compound) X)

wherein X in Formula XIV is halogen, preferably bromine or chlorine, and wherein R, R' and R'' all have the meanings previously assigned. This process is an entirely novel process which has proved to be of great value in the convenient production of compounds of formula X from readily available 1-substituted-3-pyrrolidinol starting materials, and is adaptable to considerable variations in the molecule. The starting 3-pyrrolidinols XIII wherein R' and R'' are other than hydrogen may be obtained by the procedure of C. W. Ryan et al., J. Org. Chem. 27, 2901–2905 (1962) or according to Lunsford U.S. Patent 2,830,-997 and other sources cited therein.

5-HALOALKYL-2-OXAZOLIDINONE PRODUCTION

As a general procedure for this novel reaction, the following is representative:

A solution of carbonyl dihalide, e.g., phosgene (carbonyl dichloride) or carbonyl dibromide (usually about 1–1.25 parts) dissolved in chloroform, toluene, benzene, tetrahydrofuran, or other non-reactive organic solvent, is prepared in a suitable container such as a three-neck, round-bottom flask equipped with mechanical stirrer, dropping funnel, pot thermometer and condenser, and to this solution is added one part of the properly substituted 3-pyrrolidinol (XIII).

The reaction mixture is cooled in an ice bath and the addition is at such a rate that the pot temperature is kept between 0 and 25° C. or with sufficient cooling to control the exothermic reaction. After the addition of 3-pyrrolidinol is complete, stirring is continued at the above temperature for one-half to one hour. Then, with continued cooling and stirring, two parts of a tertiary amine such as pyridine or other tertiary heterocyclic amine, dimethylaniline or other dialkylarylamine, or triethylamine or other trialkylamine is added and the mixture allowed to warm to room temperature. The solution is extracted with dilute acid, then dilute base, and finally with water. The organic layer is dried over sodium sulfate or other suitable drying agent and the solvent removed at reduced pressure. The residual neutral material may then either be distilled in vacuo or purified by crystallization from a non-polar organic solvent. The yield of the purified product ranges from approximately 25–70% of the calculated amount Preparations I–X should be consulted for further particulars and details.

The following preparations are given by way of illustration only and are not to be construed as limiting:

Preparation I.—5-(2-chloroethyl)-3-methyl-2-oxazolidinone AHR–1056

To 198 grams (2 moles) of phosgene, dissolved in 800 ml. of cold chloroform contained in a three liter, three-necked, round-bottomed flask equipped with a mechanical stirrer, dropping funnel, pot thermometer and condenser was added 204 grams (2 moles) of 1-methyl-3-pyrrolidinol in 450 ml. of chloroform. The reaction mixture was cooled in an ice bath and the addition was at such a rate that the pot temperature was kept below 10° C. After the addition of pyrrolidinol was completed, stirring was continued in cold for 0.75 hour. Then, with continued cooling and stirring, 270 ml. (2 moles) of triethylamine was added and the reaction mixture allowed to warm to room temperature. The chloroform solution was extracted with dilute HCl, then dilute NaOH and finally water. The chloroform layer was dried over sodium sulfate. The chloroform was removed at reduced pressure on a rotary evaporator. Weight of the neutral residual oil was 238 grams. This product was distilled in vacuo (0.3 to 0.6 mm.). (During the distillation there was evidence of some decomposition.) After a small forerun, 200 grams (60% yield) of distillate (B.P. 120–135° C.) which contained a small amount of crystalline solid was collected, which was redistilled using a 6-inch heated column. The product (I) boiled at 120° C. at 0.2 mm., wt. 169 grams (52% yield).

*Analysis.*—Calcd. for $C_6H_{10}NO_2Cl$: C, 44.04; H, 6.16; N, 8.56. Found: C, 44.59; H, 6.31; N, 8.41.

Preparations II through VII are carried out in the same manner as Preparation I. The corresponding 2-bromoethyl compounds are prepared using carbonyl dibromide. Table I indicates the structure and other pertinent information for these preparations.

TABLE 1

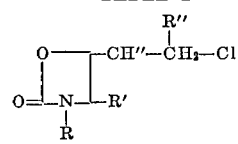

| Preparation No. | AHR No. | R | R' | R'' | M.P., °C. | B.P., °C. | Pressure mm. |
|---|---|---|---|---|---|---|---|
| II | 1045 | —$C_2H_5$ | H | H | | 120–122 | 0.2 |
| III | 1205 | —n-$C_4H_9$ | H | H | | 134–141 | 0.2 |
| IV | 1158 | Cyclohexyl | H | H | 56–59 | | |
| V | 1060 | Benzyl | H | H | 51–52 | | |
| VI | 1206 | —$CH_3$ | —$CH_3$ | H | | 125–130 | 1.5 |
| VII | 1207 | —$CH_3$ | H | —$CH_3$ | | 112–122 | 0.1 |

ANALYTICAL DATA

| Preparation No. | Calculated for— | | | Found | | |
|---|---|---|---|---|---|---|
| | C | H | N | C | H | N |
| II | 47.33 | 6.81 | 7.88 | 47.31 | 6.92 | 7.73 |
| III | | 6.81 | | | | 6.82 |
| IV | 57.01 | 7.83 | 6.04 | 57.18 | 7.84 | 6.16 |
| V | 60.12 | 5.89 | 5.84 | 60.11 | 5.76 | 5.87 |
| VI | | | 7.89 | | | 7.94 |
| VII | | | 7.89 | | | 7.87 |

Compounds of type (X) wherein X is halogen other than chlorine may also be prepared by allowing the chloro compound (X) to react with halide salts such as sodium iodide or bromide in an appropriate solvent such as acetone or methylethyl ketone.

Preparation VIII.—3-benzyl-5-(2-iodoethyl)-2-oxazolidinone AHR-1208

A solution of 12.0 grams (0.05 mole) of 3-benzyl-5-(2-chloroethyl)-2-oxazolidinone (Preparation V) and 10.5 grams (0.07 mole) of sodium iodide in 100 ml. of acetone was heated at gentle reflux with mechanical stirring for 20 hours. The reaction mixture was cooled and a white precipitate was separated by filtration and washed with acetone. The precipitate weighed 2.8 grams (95.5% of theoretical yield of sodium chloride). The combined filtrate and acetone wash were concentrated on a rotary evaporator. A brown oil remained, weight 16.8 grams. The oil was repeatedly extracetd with hot isopropyl ether leaving a dark insoluble residue. The isopropyl ether solution deposited on cooling a slightly colored solid which on recrystallization from isopropyl ether yielded 5.0 grams of a white crystalline solid, M.P. 42–43° C. Also, 3.5 grams of a slightly discolored solid was recovered, M.P. 42–43° C. Yield 51.5%.

*Analysis.*—Calcd. for $C_{12}H_{14}NO_2I$: N, 4.23. Found: N, 4.44.

In the same manner, the corresponding bromo compound is prepared, using sodium bromide instead of sodium iodide.

Preparation IX.—3-benzyl-5-(2-chloroethyl)-4,4-dimethyl-2-oxazolidinone 1-benzyl-2,2-dimethyl-3-pyrrolidinol [prepared according to the method of Ryan, C. W., et al., J. Org. Chem. 27, 2901–5 (1962) but using benzylamine rather than methylamine] is reacted with phosgene as described for Preparation I to produce the above-identified compound.

Preparation X

Other chloroethyl compounds prepared by the same method as above are shown below and the pyrrolidinols from which they are derived are indicated. These pyrrolidinols are also prepared by the method of Ryan et al.

3 - benzyl - 5 - (1 - chloro - 2 - propyl) - 2 - oxazolidinone is produced from 1-benzyl-4-methyl-3-pyrrolidinol and phosgene.

3 - benzyl - 5 - (2 - chloroethyl) - 4 - methyl - 2 - oxazolidinone is produced from 1-benzyl-2-methyl-3-pyrrolidinol and phosgene.

3-benzyl-5-(2-chloropropyl) - 2 - oxazolidinone is produced from 1-benzyl-2-methyl-4-pyrrolidinol and phosgene.

Where the foregoing preparations produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec.-butyl, t-butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, other molecular changes are readily made.

Various modifications in the compounds, compositions and methods of the invention will be apparent to one skilled in the art and may be made without departing from the spirit or scope thereof, and it is therefore to be understood that the invention is to be limited only by the scope of the appended claims.

We claim:
1. A process for the production of 3-substituted-5-(2-haloethyl)-2-oxazolidinone of the formula:

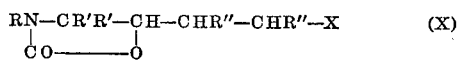

wherein X is halo selected from the group consisting of bromo and chloro, wherein R is selected from the group consisting of lower-alkyl, lower cycloalkyl, phenyl lower-alkyl, wherein R' is selected from the group consisting of hydrogen and methyl, and wherein R" is selected from the group consisting of hydrogen and methyl, which comprises the steps of (1) reacting (a) 1-substituted-3-pyrrolidinol of the formula:

wherein all the symbols have the values previously assigned, with (b) a carbonyl dihalide of the formula $COX_2$, wherein X is as previously defined, and (2) subjecting the product of the (a)–(b) reaction to reaction with (c) a tertiary amine.

2. A process of claim 1 for the production of 3-substituted-5-(2-chloroethyl) - 2 - oxazolidinone which comprises the steps of (1) reacting (a) 1-substituted-3-pyrrolidinol with (b) phosgene and (2) subjecting the product of the reaction to reaction with (c) a tertiary amine.

3. The process of claim 2 wherein the tertiary amine (c) is a trialkylamine.

4. The process of claim 2 wherein the 3-pyrrolidinol (a) reactant is 1-lower-alkyl-3-pyrrolidinol.

5. The process of claim 2 wherein the 3-pyrrolidinol (a) reactant is 1-lower-cycloalkyl-3-pyrrolidinol.

6. The process of claim 2 wherein the 3-pyrrolidinol (a) reactant is 1-aryl lower-alkyl-3-pyrrolidinol.

7. The process of claim 2 wherein the 3-pyrrolidinol (a) reactant is 1-benzyl-3-pyrrolidinol.

8. The process of claim 2 wherein the 3-pyrrolidinol (a) reactant is 1-benzyl-2-methyl-3-pyrrolidinol.

9. The process of claim 2 wherein the 3-pyrrolidinol (a) reactant is 1-benzyl-4-methyl-3-pyrrolidinol.

10. The process of claim 2 wherein the 3-pyrrolidinol (a) reactant is 1-benzyl-4,4-dimethyl-3-pyrrolidinol.

11. A process of claim 1 for the production of 5-(2-chlorethyl)-3-benzyl-2-oxazolidinone which comprises mixing and reacting phosgene and 1-benzyl-3-pyrrolidinol and subjecting the product of the reaction to further reaction with a trialkylamine.

12. A process of claim 1 for the production of 3-benzyl-5-(2-chloroethyl)-4-methyl-2-oxazolidinone which comprises mixing and reacting phosgene and 1-benzyl-2-methyl-3-pyrrolidinol and subjecting the product of the reaction to further reaction with a trialkylamine.

13. A process of claim 1 for the production of 5-(2-chloroethyl)-3-methyl-2-oxazolidinone which comprises mixing and reacting phosgene and 1-methyl-3-pyrolidinol and subjecting the product of the reaction to further reaction with a trialkylamine.

14. A process of claim 1 for the production of 5-(2-chloroethyl-)3-ethyl-2-oxazolidinone which comprises mixing and reacting phosgene and 1-ethyl-3-pyrrolidinol and subjecting the product of the reaction to further reaction with a trialkylamine.

15. 3-Substituted-5-(2-haloethyl)-2-oxazolidinone of the formula:

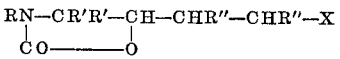

wherein X is halo selected from the group consisting of bromo and chloro, wherein R is selected from the group consisting of lower-alkyl, lower-cycloalkyl, and phenyllower-alkyl, wherein R' is selected from the group consisting of hydrogen and methyl, and wherein R″ is selected from the group consisting of hydrogen and methyl.

16. A compound of claim 15 which is 5-(2-chloroethyl)-3-methyl-2-oxazolidinone.

17. A compound of claim 15 which is 5-(2-chloroethyl)-3-ethyl-2-oxazolidinone.

18. A compound of claim 15 which is 5-(2-chloroethyl)-3-n-butyl-2-oxazolidinone.

19. A compound of claim 15 which is 5-(2-chloroethyl)-3-cyclohexyl-2-oxazolidinone.

20. A compound of claim 15 which is 5-(2-chloroethyl)-3-benzyl-2-oxazolidinone.

21. A compound of claim 15 which is 5-(2-chloroethyl)-3,4-dimethyl-2-oxazolidinone.

22. A compound of claim 15 which is 5-(1-chloro-2-propyl)-3-methyl-2-oxazolidinone.

23. A compound of claim 15 which is 3-benzyl-5-(2-iodoethyl)-2-oxazolidinone.

24. A compound of claim 15 which is 3-benzyl-5-(2-chloroethyl)-4,4-dimethyl-2-oxazolidinone.

25. A compound of claim 15 which is 3-benzyl-5-(1-chloro-2-propyl)-2-oxazolidinone.

26. A compound of claim 15 which is 3-benzyl-5-(2-chloroethyl)-4-methyl-2-oxazolidinone.

27. A compound of claim 15 which is 3-benzyl-5-(2-chloropropyl)-2-oxazolidinone.

References Cited

UNITED STATES PATENTS 2,520,150   8/1950   Kropa et al. _____ 260—307

NICHOLAS S. RIZZO, *Primary Examiner.*

B. I. DENTZ, *Assistant Examiner.*

U.S. Cl. X.R.

167—55; 260—268, 999

UNITED STATES PATENT OFFICE
CERTIFICATE OF CORRECTION

Patent No. 3,423,418                          January 21, 1969

Carl D. Lunsford et al.

It is certified that error appears in the above identified patent and that said Letters Patent are hereby corrected as shown below:

Column 4, TABLE 1, that portion of the formula reading

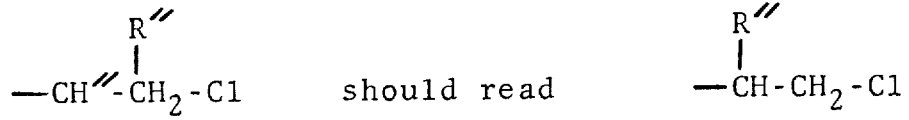

Column 6, lines 16 to 18, that portion of formula (XIII) reading

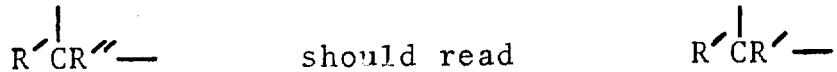

Signed and sealed this 24th day of March 1970.

(SEAL)
Attest:

EDWARD M. FLETCHER, JR.                 WILLIAM E. SCHUYLER, JR.
Attesting Officer                         Commissioner of Patents